United States Patent [19]

Harper et al.

[11] Patent Number: 4,581,727

[45] Date of Patent: Apr. 8, 1986

[54] FINDING THE DIRECTION OF A SOUND

[75] Inventors: Philip G. Harper; Stuart I. Jardine; Andrew J. Quinn; David M. Treherne, all of Edinburgh, Scotland

[73] Assignee: National Research Development Corp., London, England

[21] Appl. No.: 444,365

[22] Filed: Nov. 26, 1982

[30] Foreign Application Priority Data

Jan. 29, 1982 [GB] United Kingdom ............... 82 02553

[51] Int. Cl.$^4$ ............................................. G01S 3/80
[52] U.S. Cl. ................................... 367/118; 367/129; 367/140
[58] Field of Search .............. 181/102, 125, 0.5; 367/86, 118, 120, 124, 126, 127, 129, 140, 149, 164, 178, 188, 906; 73/655, 656, 658, 862.67

[56] References Cited

U.S. PATENT DOCUMENTS

| | | | |
|---|---|---|---|
| 3,818,425 | 6/1974 | Peynaud et al. | 367/173 |
| 3,930,556 | 1/1976 | Kusuda et al. | 181/0.5 |
| 4,180,328 | 12/1979 | Drain | 367/140 |

FOREIGN PATENT DOCUMENTS 1553251 9/1979 United Kingdom ............... 367/127

Primary Examiner—Richard A. Farley
Attorney, Agent, or Firm—Cushman, Darby & Cushman

[57] ABSTRACT

An apparatus and method for detecting the direction of a sound. A thin shell structure is permitted to flex in response to incident sound and perturb the form of the shell. The perturbation is detected and from this the direction of the sound can be determined.

16 Claims, 6 Drawing Figures

Fig. 6

1. $r = R + v\cos 2\phi$

2. $P = P_0 \cos(kx - \omega t)$

3. $x = R\cos\phi$

4. $P \simeq P_0 \cos\omega t + P_0 kR\cos\phi \sin\omega t - \tfrac{1}{2} P_0 (kR)^2 \cos^2\phi \cos\omega t$ 5. $\tfrac{1}{2} P_0 (kR)^2 \cos 2\phi \equiv f\cos 2\phi$ 6. $a = f \dfrac{\cos 2\alpha \cos(\omega t + \delta')}{\left[(\Omega'^2 - \omega^2)^2 + (\gamma\Omega)^2\right]^{1/2}}$ 7. $b = f \dfrac{\sin 2\alpha \cos(\omega t + \delta'')}{\left[(\Omega''^2 - \omega^2)^2 + (\gamma\Omega)^2\right]^{1/2}}$ 8. $u(\phi) = a\cos 2\phi + b\sin 2\phi$

FINDING THE DIRECTION OF A SOUND

This invention relates to finding the direction from which a sound is coming.

Arrangements proposed hitherto for finding the direction from which a sound is coming rely on reflectors or deflectors, such as horns or parabolic mirrors, to reduce the listening aperture of a microphone. The direction in which the arrangement points for maximum pick-up of sound then indicates the direction from which the sound is coming. Other proposals are for techniques akin to interferometry used for electromagnetic waves and compare phase to produce an estimate of direction. However such arrangements are usually large for precision, because sound wavelengths are in the order of a meter.

It is an object of the invention to provide an improved arrangement by which the direction of a sound can be found.

According to the invention there is provided an arrangement for finding the direction of a sound in a medium including a protective sound-transparent housing surrounding a thin shell structure of a form having circular symmetry, the structure to flex in response to incident sound energy from the medium and perturb the form of the structure, together with means to detect the perturbation of the form of the structure, and thereby indicate the direction of incident sound.

Conveniently the shell is of hemispherical, cylindrical or conical form with a circular opening. Preferably it is this circular opening whose perturbation is detected. The cylinder may be shorter than its diameter, in the form of a ring. The housing and shell may be symmetrical.

The means to detect perturbation of the form may be strain gauges. These may be electrical, such as semiconductor types, or optical, responding to surface patterns of the shell.

The arrangement may include means responsive to the detected perturbation of form to identify the axis or axes of said pertubation and that transverse axis of the shell to exhibit outward maximum movement amplitude and thereby indicate the direction of incident sound.

The structure is responsive to a pressure differential gradient force component of a wave and the flexural mode will have the same spatial phase as the pressure gradient force, subject to practical limitations. The identity of phase of the mode and the incident energy component permits the identification of the direction of the sound from its coincidence with or relation to the axis of the outward maximum, whose position can be indicated with reference to a known point on the shell.

An important use of the arrangement is for finding the direction of a subterranean source of sound such as a drill bit of an oil-well bore-hole or like cutter. The arrangement, which is itself preferably lowered down an adjacent bore-hole, can indicate the direction of a drill-bit from the noise it makes and thus enable the actual line of the bore-hole being drilled to be plotted and, if required, controlled to desired path. The arrangement may also be used to find the direction of other subterranean sounds, including naturally occurring sounds arising from movements of the ground.

The arrangement may also be used in the bore-hole being drilled but at a distance behind the drill-bit.

More than one arrangement may be used and their outputs combined to give more precise information of position. In order to obtain information about sound direction in three dimensions two or more shells are used and their indications correlated.

In one form of the arrangement the structure is a body of brass, of cylindrical, conical, hemispherical or other circularly symmetric shell form supported by a suspension which does not significantly affect the flexing of the shell. Conveniently the body is a hemispherical shell, or a cone, supported at the pole, or apex for the cone, to permit flexing. One example is a hemisphere, turned from brass, with a diameter of some 100 mm and shell thickness tapering from 1 mm at the rim to 0.7 mm at 45° latitude. The shell may be surrounded by an acoustic coupling fluid.

Materials other than brass are usable and are selected having regard to the value and spectrum of the frequency of the sound, and the material or medium through which the sound is propagated.

Embodiments of the invention will now be described with reference to the accompanying drawings in which:

FIG. 6 shows equations referred to in the description.

Figure 1:
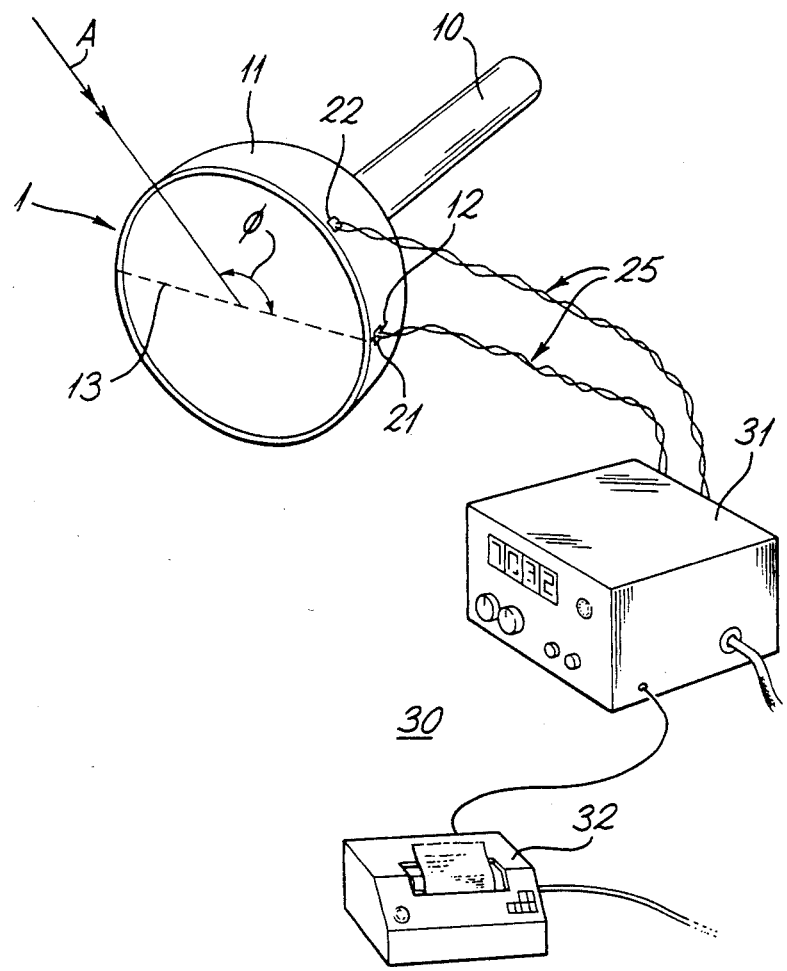
FIG. 1 shows schematically a structure, in the form of a hemispherical shell, to flex in response to incident sound energy.

Referring firstly to FIG. 1, reference 1 indicates a brass hemispherical shell a few centimeters in diameter and about one millimeter thick. A mounting or suspension arm 10 extends from the pole (not visible) of the shell 1 to a suitable support. Great care must be taken in attaching the mounting at the pole of the hemisphere to avoid any distortion or restraint of the shell which could disturb the vibration pattern. Other supports, e.g. a suspension cable, may be used as appropriate.

Strain gauges 21, 22 are shown attached to the outer surface 11 of the shell 1. Conveniently several such gauges would be spaced over the surface 11. A reference marker 12 indicates the arbitrary zero for measurements using the shell as described below. The gauges may advantageously be placed on the inner surface of the hemisphere and may be much more numerous. At least 8 or 16 are feasible and produce more information for signal processing.

The outputs of the strain gauges are connected to a signal processing and display unit 30.

Arrow A indicates a sound energy wave incident at angle $\phi$ to the shell aperture diameter 13 through the marker 12.

The action and operation of the arrangement are as follows.

A circular cross-section shell, such as the end of a cylinder or ring or the mouth of a cone or hemisphere, is capable of various modes of vibration. For shells of diameters of a few centimeters and a millimeter or so in thickness, the frequency of such vibration is in the band 100 Hz to 5000 Hz. One mode is the so-called "breathing" mode where the periphery of the circular cross-section expands and contracts while retaining its circular form. This mode, generally of a high frequency and low amplitude, will not be considered further at this point. A significant mode is the flexural mode where the form of the periphery is perturbed transversely of the periphery, typically to an approximately elliptical form. Although the curvature of the periphery is altered the length is almost unaltered.

An incident sound energy wave can excite the shell into oscillation in both the "breathing" and "flexural" modes. It is a significant feature of the invention that the shell, in the flexural mode, exhibits an oscillation which is related to the direction of incidence of the sound energy wave. (A shell can be considered as being of one or more elemental rings).

Figure 2:
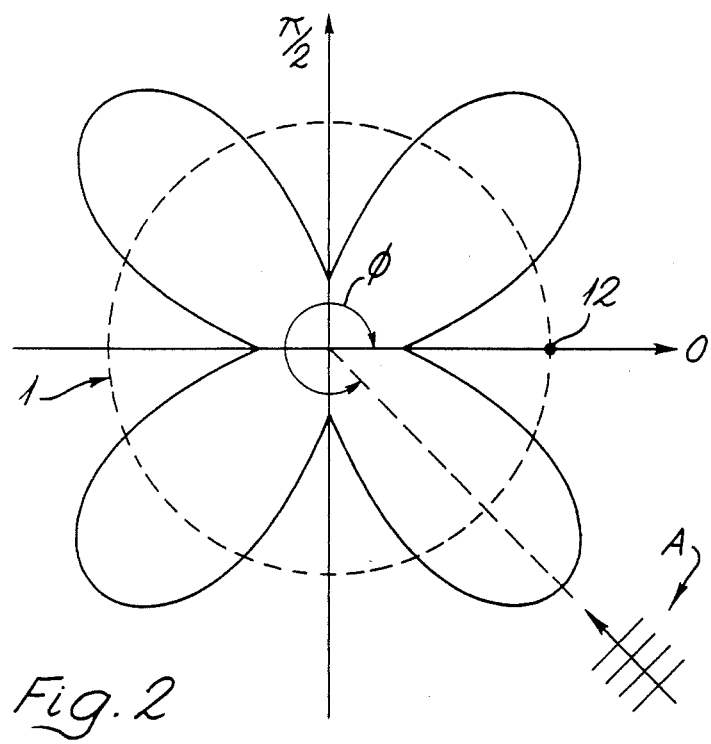
FIG. 2 shows a polar plot of flexural vibration amplitude for a given angle of incidence of sound energy on a circular aperture, e.g. the FIG. 1 structure.

FIG. 2 shows a polar plot of transverse vibration amplitude in the flexural mode, at the second harmonic, and its relation to the incident direction of the sound energy wave. When the shell is excited in the flexural mode, at the second harmonic, four equally spaced antinodes are present and the diameter of the shell through one pair of antinodes is the direction of the sound source and the diameter through the other pair of antinodes is at right angles to the first diameter. As shown in FIG. 2, and FIG. 1, the source is assumed to be in the plane of the shell aperture and at an angle $\phi$ to a reference marker 12 on the shell, so from the signals generated by the strain gauges 21, 22 etc., it is possible to determine the orientation of the antinode axes to the reference marker. It may not be possible to determine which of the four orthogonal directions represents the source so other information may be required to do this.

The flexural mode considered here is described by equation 1 of FIG. 6, where $\phi$ is the radial angle of perturbed radius v and R is the unperturbed radius of the shell region. The strain is typically between $10^{-4}$ and $10^{-5}$ so the amplitude, v, is typically of the order of a wavelength of visible light.

The equation 2 in FIG. 6 represents a plane acoustic wave propagated in a transmitting medium. $P_o$ is the pressure amplitude and x a coordinate along the propagation direction. The acoustic frequency is $\omega$ (in radians per second) and the wave number, k, is about 5 $m^{-1}$ in air and 0.5 $m^{-1}$ in solid for wavelengths in meters.

When the origin for coordinate x is taken as the centre of the circular face of the shell, radius R, and the propagation direction is at $\phi=0$, then equation 3 gives the value for x in the plane of the circular face. Equation 3, when inserted into equation 2, produces equation 4, with the assumption that kR is very much less than 1, i.e. is much smaller than the acoustic wavelength, and ignoring third order terms in kR.

The first term of equation 4 relates to the action of the wave to drive the "breathing" mode in which the entire shell is expanded and compressed. The second term relates to the action of the wave to displace each ring element of the shell in its own plane without altering the shape of each element. The factor R represents a coupling with each of the resulting "swinging" shell modes. Selection then occurs through resonance. The third term is the relevant one for the transverse flexural mode and represents a small pressure differential gradient force, proportional to $R^2 d^2P/dx^2$. The factor cos $2\phi$ can be written as $(1+\cos 2\phi)/2$ showing a $\phi$-dependence matching that of the transverse flexural mode term of equation 1. In addition to this fundamental mode there are many others, each with a characteristic frequency and R-dependence. Here $R^2$ represents the coupling, with selection again occurring through resonance. The dynamic response of the flexural mode is utilised for the direction finding operation. The effective flexural driving force of the wave can be represented as f cos $2\phi$ and this has identical phase with the amplitude (r-R) which from equation 1 is v cos $2\phi$. This means that the antinodes, where $\phi=0$, $\phi=\pi$, lie along the direction of acoustic propagation. This expresses the directional principle of "resonant spatial phase" response.

The "resonant spatial phase" response thus provides directional information, albeit with a readily resolved ambiguity, about the sound energy incident on the structure. The structure has the form of a symmetric shell, which may be for example a cylinder, a ring, a cone or a hemisphere, among other shapes, for the above analysis.

In practice the coincidence predicted may be disturbed by unbalance in the structure and the need to support the shell. However useful results can be obtained with practical devices.

Figure 3:
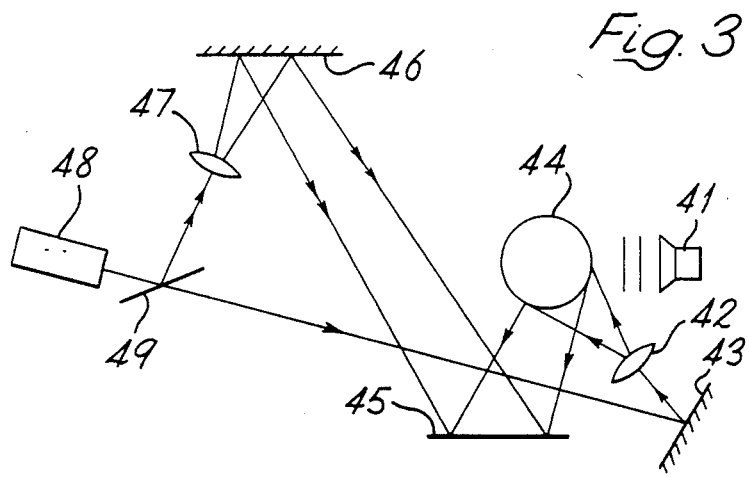
FIG. 3 shows a holographic method of detecting vibration of a structure such as that in FIG. 1, useful in testing the shells.

Time-averaged holograms as shown in FIG. 3 have been used to avoid the problems with strain gauges and clearly give the location of the antinodes, although the vibration amplitude is only about one wavelength of visible light. The resonator 44 is excited by sound from source 41 and illuminated by light from a laser 48. The laser beam is formed into an object beam and a reference beam by half-silvered mirror 49. The object beam travels to mirror 43 and via beam expander 42, illuminates the ring resonator 44 which in turn reflects light from the vibrating surface onto photographic plate 45. The reference beam is also expanded, by beam expander 47, and directed by mirror 46 onto plate 45. Interference between the beams is recorded on the plate 45 and a reconstructed hologram shows dark fringes where vibration exceeds about a quarter wavelength and thus indicates the position of antinodes on the vibrating ring. The illustrated arrangement is for use as a test instrument during design and manufacture. However, it is clear that arrangements based on optical techniques, such as holography or the examination of surface texture such as applied or etched optical patterns, may also be used for directional measurements in the field in the same manner as strain gauges.

The hemispherical shell described with reference to FIG. 1 is a structure having circular symmetry about one axis and therefore exhibits properties very similar to a ring at the free end (mouth) of the shell.

An exemplary form of the arrangement is now described in detail. A brass shell 98±0.1 mm in diameter is turned from solid material. The shell thickness tapers from 1.0±0.01 mm at the rim to 0.7±0.02 mm at the 45° latitude. The shell is held by a long brass bolt through a small hole at the pole or apex of the shell.

To determine the incident direction from the flexure of the shell the amplitude of vibration must be measured at two points of common latitude at least. In the mode of vibration where the mode number, m, is 2 the node and antinode axes are 45° apart. Accordingly 2 strain gauges at 45° separation are needed for the simplest vibration sensing arrangement.

The type of strain gauge must be chosen with care. The gauge must not load the shell too heavily, either in itself or by its fixing, and the connection leads must be as light as possible. In particular noise "pick-up" in the leads should be minimised. Low-impedance strain gauges have given better results than high-impedance types. Thus semiconductor gauges have been found more suitable than polyvinyl difluoride ones.

The gauges are attached with a cement, such as "Durafix" (RTM). To reduce loading the gauges are only 1 mm long and with a mass less than 1 mg. Small gauges also improve the resolution.

A small (85 mm diameter) loudspeaker was placed about 150 mm from the suspended shell and the speaker energised at 100 mw (electrical power input). Collimated sound sources were also used, placed at greater distance from the shell, and gave results similar to the loudspeaker. This indicated that a loudspeaker source was suitable although the analysis above is for a plane wave propagating parallel to the plane of the mouth of the hemisphere. Although the shell was about 10 centimeters in diameter the strain gauges and their wires produced problems when attached to the shell.

The fundamental resonant frequency of the shell, in the flexural mode, was found to be 241.0 Hz when excited by an oscillator varied at 0.08 Hz/min. The flexural mode was split, with components less than 0.1 Hz apart, due to small deviations from symmetry in the shell resonator. The Q-factor of the shell in air was 4000 and for this reason a slow change of oscillator frequency is needed. The shell need not taper but was easier to make in this form. Also the shell could be thicker, e.g. say up to 3 mm for the 100 mm diameter.

The signals from the gauges 21, 22 are carried on leads 25 of the finest possible wire, unscreened to reduce loading, and supplied to a suitable amplifier and filter 31. A head amplifier on the shell support, may be used. Care is taken to avoid unwanted electrical or mechanical couplings in the arrangement. The amplified gauge signals are passed through a band pass filter in unit 31, with a pass band of 100 Hz to 1000 Hz, and then displayed on a chart recorder 32.

The form of the strain gauges is most important because of their possible effect on the vibration of the shell. To avoid the localised extra mass of a glued-on gauge it is possible to apply evaporated gauges directly to the shell. An insulating layer, e.g. of silicon oxide, is applied to the shell surface first and the metal or semiconductor or other strain gauge material then applied on this layer. Connections can also be by conductors deposited on the insulating layer, or the shell itself can be one conductor with connection made through or around the insulating layer.

Clearly other forms of display are possible for various applications of the arrangement and the signals may be processed for such presentation as required.

Figure 5:
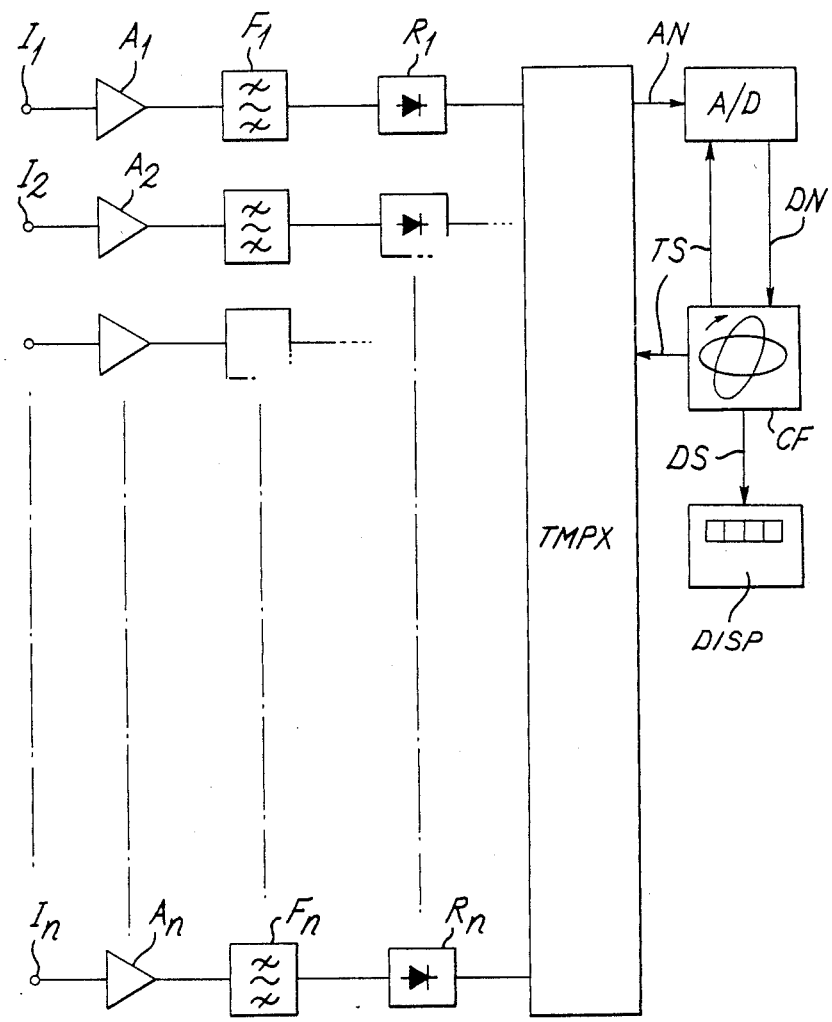
FIG. 5 shows an alternative processing arrangement for the strain gauge signals.

FIG. 5 shows details of one signal processing and display part of the arrangement where "n" strain gauges are used. The processing is based on "curve-fitting" to identify the direction of the incident sound by finding out the actual vibration pattern in the shell and comparing this with a reference of either individual patterns representing discrete incident direction values or a pattern which can be varied substantially continuously, representing a substantially continuous variation of incident direction value, to identify the incident direction as that for the best "fit" of the actual and reference patterns. Curve fitting techniques are known and will not be described further.

In the Figure, eight strain gauge signals are provided for but "n" can be larger or smaller than eight depending on requirements of accuracy and allowable signal processing costs. The strain gauge signals are applied to individual input terminals $I_l$ to $I_n$. (These signals may already have passed through a "head amplifier"). Each input terminal is part of an individual channel to a multiplex unit. Each of the n channels includes an amplifier A, a bandpass filter F and a rectifier R, indentified by subscripts. The signals from amplifier A are applied to filter F which has a pass-band of about 30 Hz centred on 100 Hz. This pass-band allows the signal processing to "track" variations in shell resonant frequency. The filtered signals are rectified and applied to a time division multiplexer TMPX. These signals are still in analog form AN. As it is more convenient to compare signals in digital form the output of the multiplexer is supplied to an analog/digital converter A/D. A timing signal TS is also applied to the multiplexer and converter to maintain synchronism. The output of converter A/D is thus a time-based series of digital numbers DN, in this case in groups of eight, representing the vibration amplitude around the shell. In curve fitting unit CF these numbers are compared with groups of numbers representing a known sound incidence direction to produce a value for this direction corresponding to the best "fit". This value is the direction signal DS and is shown on a suitable display DISP. Clearly a reference direction is needed. This can be, say, the position of the strain gauge of channel 1.

One method of producing the value includes accumulating the average value of several numbers for each channel and fitting these values for all the channels by a "least squares" technique.

Conveniently the curve fitting is done with a microprocessor or like device to provide the information quickly and conveniently.

As mentioned above although in theory the flexural mode will be "pinned" to the incident direction of the sound energy wave, in practice irregularity of the resonator may load it and thereby pin the mode position. The irregularity may be caused by one or more of the resonator mounting, the addition of the sensors and imperfections in the resonator itself. Other frequencies may be used. Pass bands may be 20 to 40 Hz and centred in the band of below 100 Hz to above 200 Hz. A 30 Hz pass band at 140 Hz has also been used.

The vibrations of a free shell include various mode states identified with cos $m\phi$ and sin $m\phi$ terms where $m=1,2,3$, etc. For $m=2$ the nodal axes are at 45° and when the acoustic wave is incident at $\phi=0$ on an unloaded shell the even, cosine, mode is excited while the odd, sine, mode degenerates.

When the shell is unbalanced by a loading, of the various types above, there are three consequences:
(1) the even/odd degeneracy is removed and resonant splitting occurs,
(2) the nodal axes are fixed relative to the loading asymmetry,
(3) both odd and even modes may be excited, depending on Q-factor and orientation.

To show that despite such load pinning accurate measurement is possible, the resonator just described was deliberately loaded. The "load pinning" now fixes the flexural mode position, so that it is not dependent on the angle at which incident. To adapt to this situation the position of the antinode set by load pinning is made the reference for measurement of sound direction. The angle $\phi$ thus remains the angle between the transverse vibration antinode (now the result of "pinning") and the arbitrary reference 12 on the shell, say, at sensor 21. The sound wave incidence angle is now represented by $\alpha$, measured anti-clockwise from the "pinning" direction. (The angle between the reference 12 and the sound direction is thus $(\phi-\alpha)$.) A small load, large enough to mask any unknown intrinsic loading, was placed at sensor 22, i.e. $\phi=45°$. The load was a mass of 55 mg. Acoustic direction was varied and the outputs of the sensor 21 and 22 noted. The outputs to be expected from the sensors for various values of $\alpha$ were calculated as described below. The direction indicated by the arrangement was the one for which the calculated values corresponded most closely to the observed values. A comparison of the actual direction and the direction indicated is shown in the Table. A similar test was carried out with the load at $\phi=22.5°$ i.e. midway between sensors 21 and 22 and the results shown in the table.

In FIG. 6 equations 6 and 7 show the effect of taking $\alpha$ into account (measured anticlockwise) and that of the presence of odd and even modes. For small values of relative mass change, g the time-dependent amplitudes of the free even and odd second harmonic vibrational states are denoted by a and b and can be expressed as in equations 6 and 7. In these equations the vibration frequency $\Omega$ is split into two components $\Omega'$ and $\Omega''$, $\gamma$ is a damping coefficient and $\delta'$, $\delta''$, are the phase angles. The difference between $\Omega'$ and $\Omega''$ is proportional to g and numerically in this example, about 0.1 Hz.

Equation 8 shows the basis for the calculation of the outputs, u, to be expected from the sensors using coefficients a and b given above. These calculations provide the basis for the above comparisons.

The table shows that an overall accuracy of some 2 degrees is attainable even with the experimental arrangement described.

Figure 4:
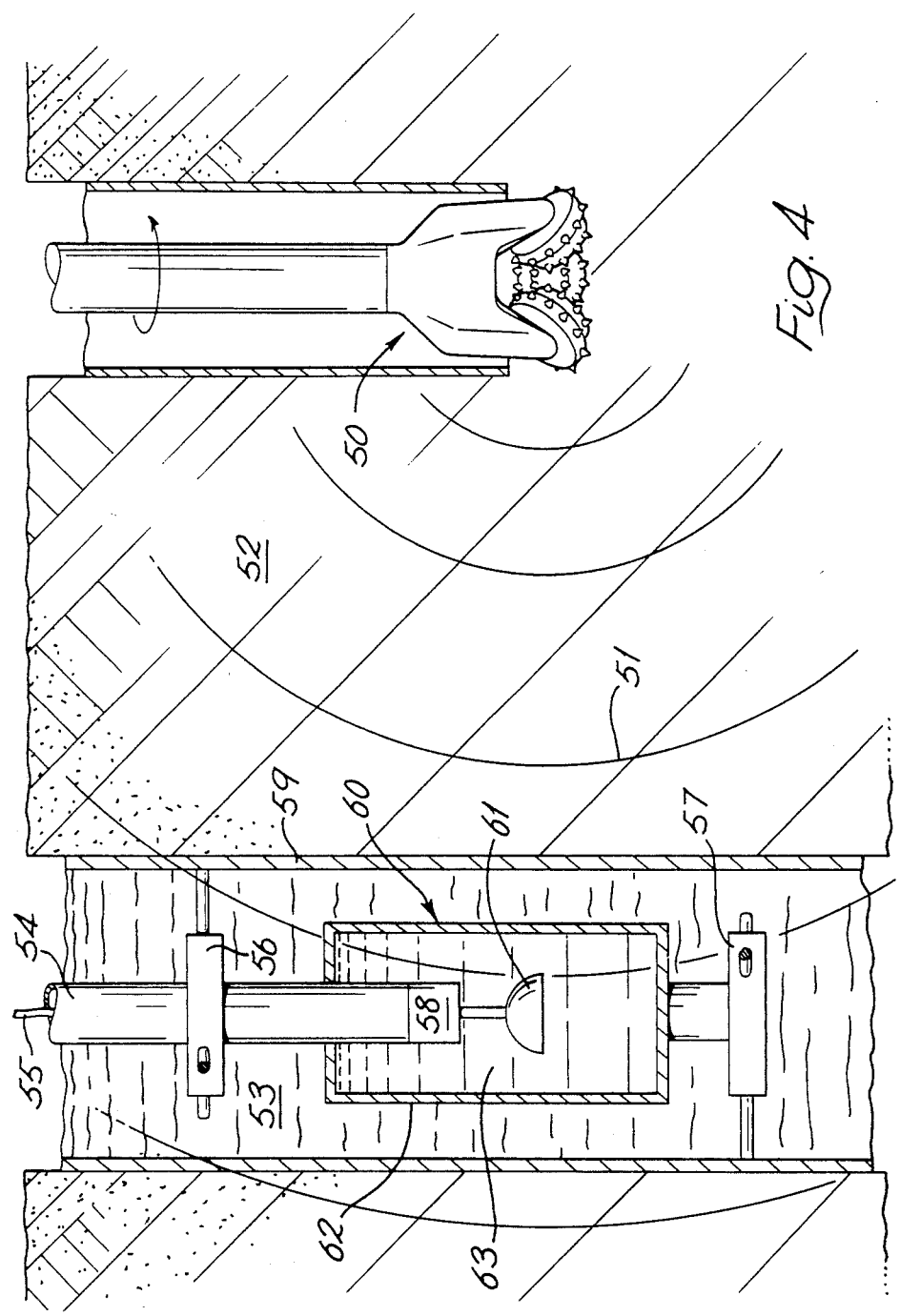
FIG. 4 shows an arrangement to monitor the direction of a bore-hole while it is being drilled.

FIG. 4 shows the application of an embodiment of the invention to finding the direction of the sound from a drill-bit or cutter working in a bore-hole in the ground to monitor the movement of the drill-bit and thus the direction of the bore hole.

A drill-bit and bore-hole to be monitored are indicated at reference 50 in outline and sound waves are indicated at 51 as being propagated, from the noise made by the drill-bit cutting the ground, through the surrounding ground 52. The arrangement embodying the invention for finding the direction of sound is indicated generally at 60.

The arrangement 60 is lowered down a bore-hole 59 adjacent to the bore-hole being made by the drill-bit to be monitored (50). The bore-hole 59 can have a conventional casing and will be in contact with the surrounding ground 52, by external grouting or the like if needed. The bore-hole 59 is filled with drilling mud, or like material 53, at least around arrangement 60 to provide acoustic coupling between arrangement 60 and the ground 52 for the propagation of the sound waves 51. The arrangement 60 is suspended by a suitable member 54 through which a cable 55 including electrical conductors passes to the arrangement. The arrangement is positioned in the bore hole 59 by spacer means 56, 57 each of which are conveniently three-armed "spiders" which make contact with the bore 59 to centralise the arrangement 60 in it. The spacer means may be controlled from the surface of the ground by electrical or hydraulic or other means (not shown) if required.

The arrangement 60 includes a strong housing 62 to protect the shell 61 and electronics unit 58 and to contain an electrically insulating acoustic coupling fluid 63 in which shell 61 is immersed. (The fluid is electrically insulating to avoid interference with the strain gauges). The shell 61 and electronics unit 58 are of the general form described above. The output of the electronics unit is conveniently the digital information identified at DN in FIG. 5 as this signal is resistant to interference and degradation in transmission along cable 55.

Although a single shell 61 is shown in the Figure more than one shell may be used and these may be arranged to provide information in more than one plane of incidence of the sound wave. Thus three shells on orthogonal axes can provide information from which the direction of the sound source in three dimensional space can be found. The resolution techniques to achieve this are readily apparent and will not be described.

The coupling of the shell 61 to the sound wave 51 is clearly important for the effective operation of the arrangement. It is believed that any reduction of response amplitude due to the insulating fluid damping resonance is offset by the better coupling achieved with liquid and solid media.

The arrangement is capable of indicating the direction of a source of sound with considerable accuracy and has been found to be effective with other coupling media besides air. The arrangement is effective when lowered down a bore hole, which may itself be in the sea-bed or otherwise submerged, to indicate the direction of a subterranean sound, e.g. a working drill or a "blow-out" in a well shaft. The arrangement may therefore be used to provide guidance information for a drill which is intended to bore a shaft in a specific direction. In a related use in the exploitation of oil and gas the arrangement may be used to detect the position of a leak in a pipeline from the noise made by fluid as it escapes. In other forms of subterranean exploitation the arrangement may be used to determine the direction and degree of artificially induced cracking of the ground. Thus where ground of low permeability is cracked to increase productivity by the application of hydraulic pressure the cracks which can be in a vertical direction, may be observed by use of one or more of the devices described above to "listen" to the sounds caused. The technique is also relevant to the extraction of geothermal energy.

TABLE

| DIRECTION | $\alpha$ | $\phi$ | $\alpha$ | $\phi$ | $\alpha$ | $\phi$ | $\alpha$ | $\phi$ | $\alpha$ | $\phi$ | $\alpha$ | $\phi$ | $\alpha$ | $\phi$ | $\alpha$ | $\phi$ |
|---|---|---|---|---|---|---|---|---|---|---|---|---|---|---|---|---|
| ACTUAL | 45° | 45° | 35° | 45° | 22.5° | 45° | 0° | 45° | 22.5° | 22.5° | 12.5° | 22.5° | 0° | 22.5° | −12.5° | 22.5° |
| INDICATED | 43° | 49° | 33.5° | 49° | 19° | 49° | −1° | 49° | 24° | 23° | 12° | 24° | −1.5° | 24° | −9° | 23° |

We claim:

1. An arrangement for finding the direction of a sound in a medium including a protective sound-transparent housing surrounding a thin shell structure of a form having circular symmetry, the structure to flex in the transverse flexural mode in response to incident sound energy from the medium and perturb the form of the structure, together with means to detect the perturbation of the form of the thin shell structure by the flexing in said mode, and thereby indicate the direction of the incident sound energy.

2. An arrangement according to claim 1 in which the shell structure form is one of hemispherical, cylindrical and conical and has a circular opening.

3. An arrangement according to claim 2 in which the perturbation detected is that of the circular opening.

4. An arrangement according to claim 2 in which the shell structure is a cylinder shorter than its diameter, that is a ring.

5. An arrangement according to claim 1 in which the means to detect said perturbation of shell structure form are strain gauges.

6. An arrangement according to claim 5 in which the strain gauges are of semi-conductor material and deposited on the shell.

7. An arrangement according to claim 1 in which the means to detect said perturbation of shell structure form includes means to apply light to the shell and means to assess the extent of the perturbation in terms of the wavelength of the light.

8. An arrangement according to claim 1 including means responsive to the detected perturbation of form to identify the axis or axes of said perturbation and that transverse axis of the shell structure to exhibit outward maximum movement amplitude and thereby indicate the direction of incident sound.

9. An arrangement according to claim 1 for use underground in a borehole in which the housing is arranged to resist pressure and transmit sound from surrounding ground whereby the direction of a sound in the ground can be determined.

10. An arrangement for finding the direction of a sound in a medium including a protective pressure-resistant sound conductive housing enclosing a thin shell structure with an open end and a closed end having a circularly symmetric shell form, support means for the shell structure engaging the closed end and supporting the shell within the housing to permit the open end of the shell structure to flex along axes at right angles in response to incident sound energy and perturb the form of the structure together with means to detect the perturbation of the form of the structure and thereby define the direction of the incident sound as one of said axes.

11. An arrangement according to claim 10 in which the shell structure is of metal of hemispherical form and the housing contains an acoustic coupling fluid in which the shell structure is immersed.

12. An arrangement according to claim 11 in which the shell structure has a thickness of between one fiftieth and one-hundredth of the diameter.

13. An arrangement according to claim 10 in which the housing is circularly symmetrical with the shell structure.

14. An arrangement according to claim 1 in which the means to detect the perturbation of the form of the structure includes a number of strain gauges on the shell structure to produce respective signals and further includes signal processing means away from the shell structure responsive to said signals, the signal processing means including means to generate a plurality of sets of signals representing possible signals from the strain gauges, each set corresponding to a particular incident direction of sound and means to compare the generated sets of signals with the signals from the strain gauges for an actual incident sound to determine the direction of the actual sound by the correspondence of the actual and generated signals.

15. A method finding the direction of a sound in a medium including providing a thin shell structure in a form having circular symmetry, permitting the shell structure to flex in the transverse flexural mode in response to incident sound energy and perturb the form of the stucture, housing the structure to receive sound energy from said medium while protected by the housing, detecting the perturbation of the form of the structure by the flexing in said mode and thereby indicating the direction of incident sound energy.

16. A method according to claim 15 including further detecting from the perturbation of form the axis or axes of the perturbation and that transverse axis of the shell exhibiting outward maximum movement amplitude to thereby indicate said direction.

* * * * *